United States Patent
Cheong et al.

(10) Patent No.: US 11,716,668 B2
(45) Date of Patent: Aug. 1, 2023

(54) WIRELESS CHANNEL SELECTION MANAGEMENT SYSTEM AND METHOD OF USING THE SAME

(71) Applicant: Dell Products, L.P., Round Rock, TX (US)

(72) Inventors: Minho Cheong, Round Rock, TX (US); Vivek Viswanathan Iyer, Austin, TX (US); Dileep Kumar Soma, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 63 days.

(21) Appl. No.: 16/951,095

(22) Filed: Nov. 18, 2020

(65) Prior Publication Data

US 2022/0159543 A1 May 19, 2022

(51) Int. Cl.
*H04W 40/02* (2009.01)
*H04W 48/20* (2009.01)
*H04W 72/0453* (2023.01)
*H04W 72/51* (2023.01)

(52) U.S. Cl.
CPC .......... *H04W 40/02* (2013.01); *H04W 48/20* (2013.01); *H04W 72/0453* (2013.01); *H04W 72/51* (2023.01)

(58) Field of Classification Search
CPC . H04W 40/02; H04W 48/20; H04W 72/0453; H04W 72/048
See application file for complete search history.

(56) References Cited

U.S. PATENT DOCUMENTS

| | | | | |
|---|---|---|---|---|
| 8,655,307 B1* | 2/2014 | Walker | ............. | H04W 52/0258 455/574 |
| 2004/0259558 A1* | 12/2004 | Skafidas | ............. | H04W 16/14 455/450 |
| 2009/0010274 A1* | 1/2009 | Koskan | ............. | H04W 72/06 370/437 |
| 2013/0100986 A1* | 4/2013 | Gettings | ............. | H04W 72/048 901/1 |
| 2017/0359689 A1* | 12/2017 | Chhabra | ............. | H04W 8/005 |
| 2019/0222997 A1* | 7/2019 | Reshef | ............. | H04W 8/005 |
| 2019/0373470 A1* | 12/2019 | Meredith | ............. | H04W 12/03 |

FOREIGN PATENT DOCUMENTS

WO     WO-0027143 A1 *  5/2000             G01S 5/12

* cited by examiner

*Primary Examiner* — Marisol Figueroa
(74) *Attorney, Agent, or Firm* — Fogarty LLP

(57) ABSTRACT

According to one embodiment, a communication system including first and second electronic devices that communicate with one another over a plurality of wireless channels. The first electronic device is configured to establish a connection with a second electronic device using a first wireless channel that operates according to a first wireless communication protocol. During communication via the first wireless channel, the first electronic device identifies an operational context of the first electronic device in which the operational context includes a proximity of the first electronic device relative to the second wireless device, and based on the identified operational context, establishes the connection with the second electronic device using a second channel that operates according to a second wireless communication protocol. The first wireless communication protocol is different than the second wireless communication protocol.

18 Claims, 5 Drawing Sheets

| | OP CONTEXT | BATTERY PERFORMANCE MODE (INPUT) | INDOOR LOCATION (INPUT) | DIRECTION OF MOVEMENT WRT DOCK (INPUT) | JAMMING SIGNAL DETECTION (INPUT) | DOCK CONNECTION STATUS (INPUT) | OPERATION MODE (OUTPUT) |
|---|---|---|---|---|---|---|---|
| 500 | | | | | | | |
| 502 | OFFICE | BEST PERFORMANCE | OFFICE CUBE | TOWARDS THE DOCK | NO | NOT CONNECTED | 416 |
| 504 | CONFERENCE ROOM | BEST PERFORMANCE | CONFERENCE ROOM | NONE | NO | CONNECTED | 418 |
| 506 | CAFETERIA | BEST PERFORMANCE | CAFÉ | NONE | NO | NOT CONNECTED | OFF |
| 508 | OFFICE | POWER SAVING | OFFICE CUBE | AWAY FROM THE DOCK | NO | NOT CONNECTED | OFF |
| 510 | OFFICE | BEST PERFORMANCE | OFFICE CUBE | TOWARDS THE DOCK | YES | NOT CONNECTED | 420 |
| 512 | CONFERENCE ROOM | POWER SAVING | CONFERENCE ROOM | NONE | NO | CONNECTED | 414 OR 418 |
| | ○ ○ ○ | ○ ○ ○ | ○ ○ ○ | ○ ○ ○ | ○ ○ ○ | ○ ○ ○ | ○ ○ ○ |

FIG. 5

WIRELESS CHANNEL SELECTION MANAGEMENT SYSTEM AND METHOD OF USING THE SAME

FIELD

The present disclosure relates generally to communication links, and more particularly, to a wireless channel selection management system and method of using the same.

BACKGROUND

Mobile and/or wireless electronic devices are becoming increasingly popular. For example, mobile telephones, portable computers (e.g., laptop computers), and portable media players are now in wide-spread use. In addition, the features associated with certain types of electronic devices have become increasingly diverse. To name a few examples, many electronic devices have cameras, text messaging capability, Internet browsing functionality, electronic mail capability, video playback capability, audio playback capability, image display capability and hands-free headset interfaces.

Some wireless electronic devices allow the user to transfer stored data to another wireless device or other item of electronic equipment (e.g., a desktop or laptop computer) using a wireless channel, such as a Bluetooth interface, an infrared (IR) interface, or another mechanism. As used herein, the term transfer includes copying data so that the originating device and the target device each store the data after transfer. Data transfer also may refer to moving data so that only the target device stores the data after transfer. A communication link generally refers to a connection whereby information in the form of data (e.g., voice, digital data, etc.) may be transferred from one electronic device to another. In many cases, operation of the communication is governed by a link protocol that establishes how the information is to be transmitted or received.

Wireless electronic devices, such as those described above, may be referred to as information handling systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

According to one embodiment, a communication system including first and second electronic devices that communicate with one another over a plurality of wireless channels. The first electronic device is configured to establish a connection with a second electronic device using a first wireless channel that operates according to a first wireless communication protocol. During communication via the first wireless channel, the first electronic device identifies an operational context of the first electronic device in which the operational context includes a proximity of the first electronic device relative to the second wireless device, and based on the identified operational context, establishes the connection with the second electronic device using a second channel that operates according to a second wireless communication protocol. The first wireless communication protocol is different than the second wireless communication protocol.

According to another embodiment, a method includes establishing a connection with a second electronic device using a first wireless channel that operates according to a first wireless communication protocol. The method further includes identifying an operational context of the first electronic device in which the operational context includes a proximity of the first electronic device relative to the second wireless device. Based on the identified operational context, the method establishes the connection with the second electronic device using a second channel that operates according to a second wireless communication protocol. The first wireless communication protocol is different than the second wireless communication protocol.

According to yet another embodiment, an information handling system (IHS) establishes a connection with a second electronic device using a first wireless channel that operates according to a first wireless communication protocol, identifies an operational context of the first electronic device, the operational context comprising a proximity of the first electronic device relative to the second wireless device, and establishes the connection with the second electronic device using a second channel that operates according to a second wireless communication protocol based on the identified operational context of the first wireless device. The first wireless communication protocol is different than the second wireless communication protocol

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 5 illustrates an example table showing how the wireless channel selection engine may determine an operation mode of the IHS according to various exemplary criteria associated with its operational context according to one embodiment of the present disclosure.

DETAILED DESCRIPTION

Figure 1:
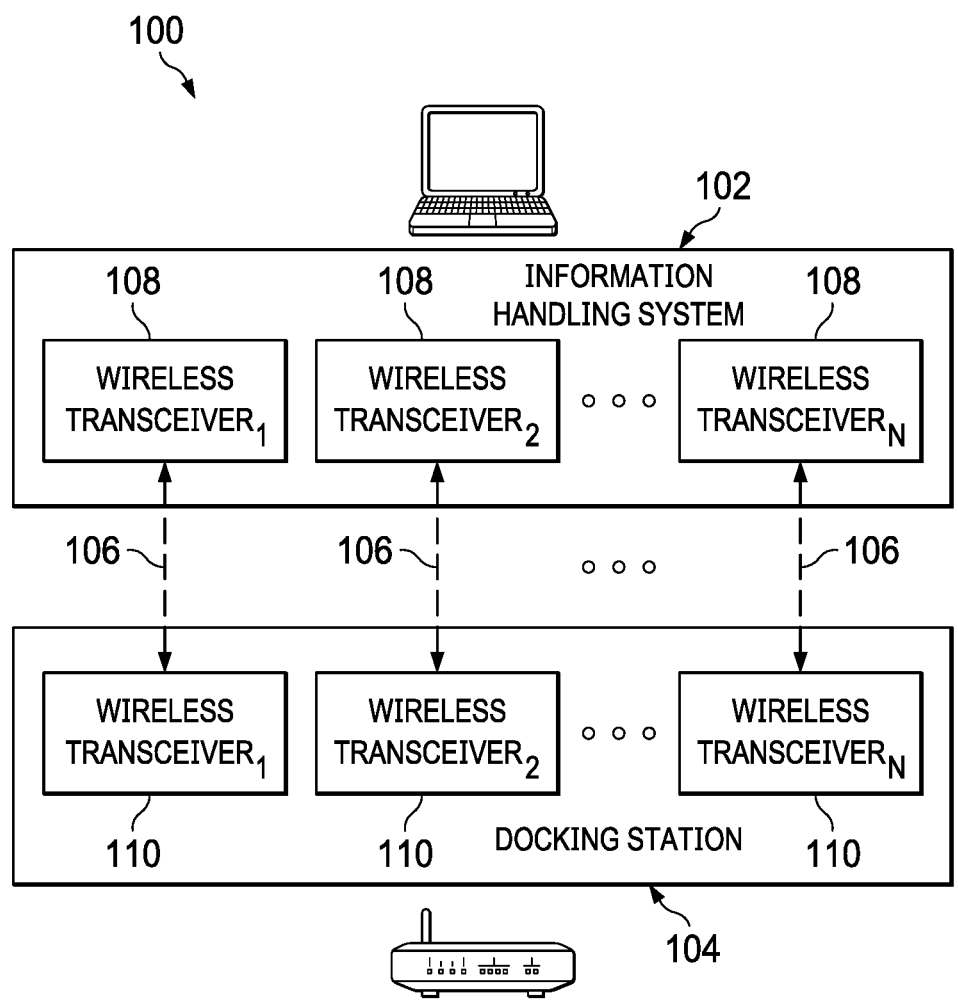
FIG. 1 illustrates an example wireless channel selection management system according to one embodiment of the present disclosure.

Embodiments of the present disclosure provide a wireless channel selection management system for a communication link between an information handling system (IHS) and a docking station that selects one wireless channel from among multiple available wireless channels according to an operational context of the IHS. The operational context of the IHS may include its geographical location, connection status, battery performance mode, level of jamming signals detected, movement and or position relative to its docking station, and time period of the day. The wireless channel selection management system leverages multiple wireless channels currently available in the docking station to provide selection of one or more channels for wireless communication that best suits the operational context of the IHS at any given time. The wireless channel selection management system may be also provided with a machine learning algorithm that automatically selects a particular channel wireless channel according to its operational context.

An IHS may be provided with a docking station. Generally speaking, a docking station (e.g., port replicator) provides a simplified means of "plugging-in" a laptop computer to commonly used peripherals, such as USB devices, Ethernet cables, system power cables, and the like. A docking station can allow some IHSs, such as laptop computers, to emulate a desktop computer without sacrificing its mobile computing functionality. In many cases, IHSs can dock and undock hot, cold or standby, depending on the capabilities of the system. Whereas traditional docking stations employed the use of connectors to connect the IHS to the docking stations, newer designs have been equipped with wireless transceivers to alleviate the necessity of physically coupling the IHS to its docking station.

An IHS may wirelessly connect to the wireless docking station to enhance its functionality. The docking station may have the capability to connect to a network, such as the Internet, either through Ethernet cabling or wirelessly. The docking station relays information or network requests to the docking station in a pre-agreed upon channel that both IHS and docking station use to communicate. The docking station relays the requests through a backhaul channel. In terms of the docking stations functionality, a backhaul channels refers to the process in which the wireless docking station connects to the Internet. A fronthaul channel, on the other hand, refers to a one in which information is conveyed between the wireless docking station and IHS. For purposes of this disclosure, the wireless channel selected by the proximity detection system refers to fronthaul-based communications.

In many cases, a docking station may possess multiple wireless technologies in which a wireless channel may be established with an IHS. Examples of such wireless technologies may include a Wi-Fi protocol based on the IEEE802.11 family of standards, a Bluetooth protocol, an ultra wide band (UWB) protocol, a WiGig (60 GHz Wi-Fi) protocol, a near field communications (NFC) protocol, and the like. While multiple wireless technologies may be available, each wireless technology has its own advantages and disadvantages. Relying on a single wireless technology for proximity detection would have several drawbacks. For example, a certain wireless technology may be inhibited from operation due to several factors, such as poor transceiver reception, operational failure, a disallowed state by the IHS, and the like. As another example, users may be exposed to numerous vulnerabilities that certain technology-based proximity detection schemes would have (e.g., security issues, poor resolution performance, distance coverage issues, excessive power consumption, etc.).

Considering a specific use case, an IHS is operating in a best battery performance mode and using extended coverage mode for proximity detection. If the IHS were to go to a battery saving mode, then it would advantageous to have the IHS to also switch to a reduced power consumption proximity mode. Considering another specific use case, a user is operating the IHS in an office or cube structure that is connected to a wireless dock. As such, the IHS's coverage mode may be best served using a wireless technology having a broad beam propagation structure with less distance coverage. However, if the user were to move to a remote location, such as a conference room, the wireless communication channel between the IHS and its docking station should switch to one having a narrow beam propagation structure with extended distance coverage.

FIG. 1 illustrates an example wireless channel selection management system 100 according to one embodiment of the present disclosure. Wireless channel selection management system 100 includes an information handling system 102 in communication with a docking station 104 via multiple available wireless channels 106, each functioning according to a different protocol using wireless transceivers 108 configured in IHS 102 as well as transceivers 110 configured in docking station 104. As will be described in detail herein below, wireless channel selection management system 100 selects one wireless channel 106 from among multiple available wireless channels for communication of a computing system with its associated docking station. Additionally, a machine learning mode may be provided so that a particular wireless channel may be selected that best suits the operational context of the computing system at any given point in time.

Although the wireless channel selection management system is shown and described as being implemented on an IHS and its associated docking station, it is contemplated that the wireless channel selection management system may be implemented on any suitable electronic device that wirelessly communicates with another electronic device without departing from the spirit and scope of the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
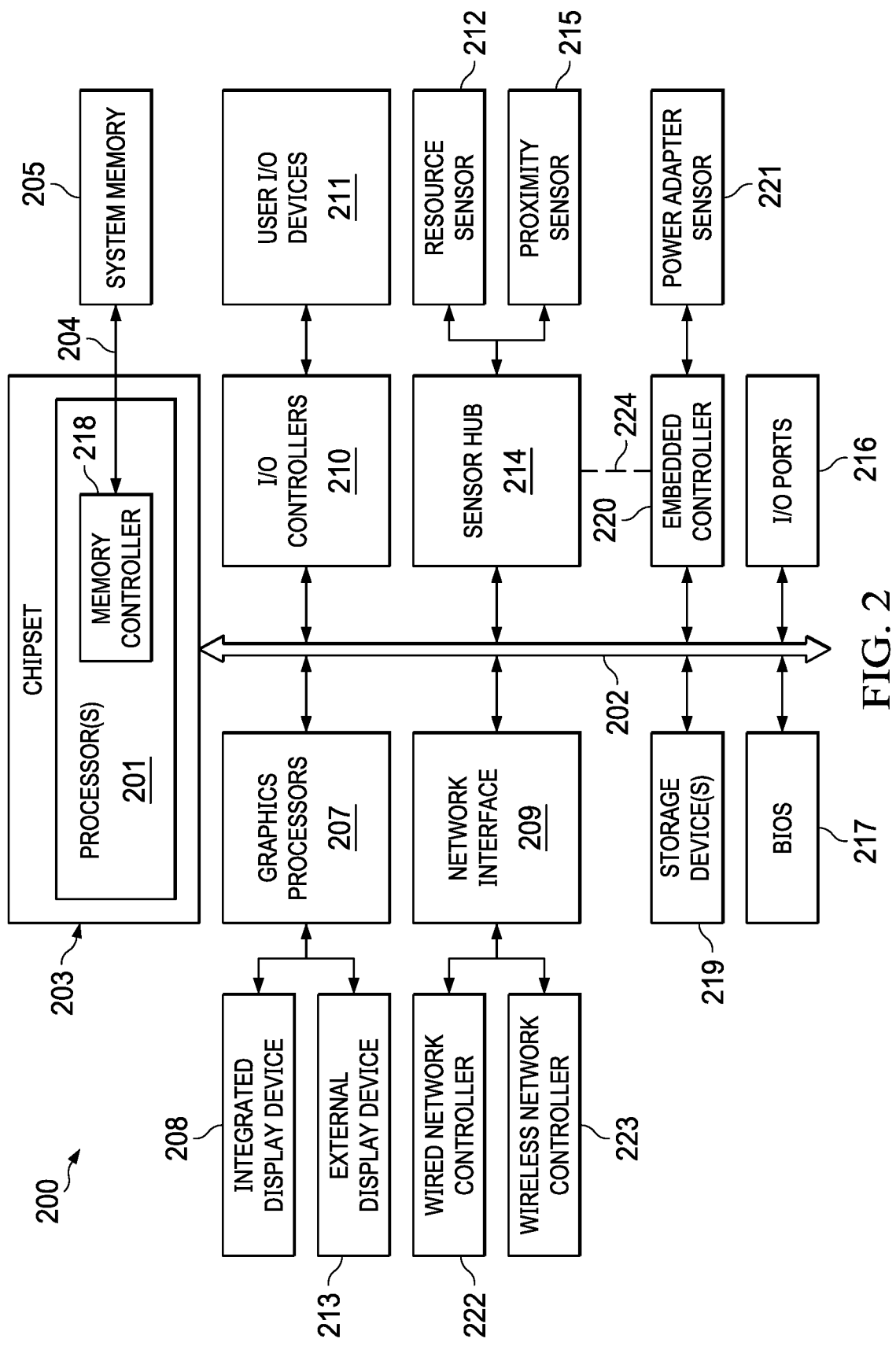
FIG. 2 is a block diagram illustrating components of example IHS configured to manage a communication link with a wireless docking station according to one embodiment of the present disclosure.

FIG. 2 is a block diagram illustrating components of example IHS 102 configured to manage a communication link with a wireless docking station according to one embodiment of the present disclosure. As shown, IHS 102 includes one or more processors 201, such as a Central Processing Unit (CPU), that execute code retrieved from system memory 205. Although IHS 102 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 102 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), and/or NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 102 utilizes chipset 203 that may include one or more integrated circuits that are connect to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 102, bus 202 is illustrated as a single element. Various embodiments may utilize any number of separate buses to provide the illustrated pathways served by bus 202.

In various embodiments, IHS 102 may include one or more I/O ports 216 that may support removable couplings with various types of external devices and systems, including removable couplings with peripheral devices that may be configured for operation by a particular user of IHS 102. For instance, I/O 216 ports may include USB (Universal Serial Bus) ports, by which a variety of external devices may be coupled to IHS 102. In addition to or instead of USB ports, I/O ports 216 may include various types of physical I/O ports that are accessible to a user via the enclosure of the IHS 102.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 102 via network interface 209. In various implementations, I/O controller 210 may support the operation of one or more user I/O devices 210 such as a keyboard, mouse, touchpad, touchscreen, microphone, speakers, camera and other input and output devices that may be coupled to IHS 102. User I/O devices 211 may interface with an I/O controller 210 through wired or wireless couplings supported by IHS 102. In some cases, I/O controllers 210 may support configurable operation of supported peripheral devices, such as user I/O devices 211.

As illustrated, a variety of additional resources may be coupled to the processor(s) 201 of the IHS 102 through the chipset 203. For instance, chipset 203 may be coupled to network interface 209 that may support different types of network connectivity. IHS 102 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 102.

Chipset 203 may also provide access to one or more display device(s) 208 and 213 via graphics processor 207. Graphics processor 207 may be included within a video card, graphics card or within an embedded controller installed within IHS 102. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 102.

One or more display devices 208 and 213 coupled to IHS 102 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 102 accessed via bus 202. In some cases, power to graphics processor 207, integrated display device 208 and/or external display device 213 may be turned off, or configured to operate at minimal power levels, in response to IHS 102 entering a low-power state (e.g., standby).

As illustrated, IHS 102 may support an integrated display device 208, such as a display integrated into a laptop, tablet, 2-in-1 convertible device, or mobile device. IHS 102 may also support use of one or more external display devices 213, such as external monitors that may be coupled to IHS 102 via various types of couplings, such as by connecting a cable from the external display 213 to external I/O port 216 of the IHS 102. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 102 or may be external to IHS 102. In certain embodiments, storage device 219 may be accessed via a storage controller that may be an integrated component of the storage device. Storage device 219 may be implemented using any memory technology allowing IHS 102 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 102 also includes Basic Input/Output System (BIOS) 217 that may be stored in a non-volatile memory accessible by chipset 203 via bus 202. Upon powering or restarting IHS 102, processor(s) 201 may utilize BIOS 217 instructions to initialize and test hardware components coupled to the IHS 102. BIOS 217 instructions may also load an operating system (OS) (e.g., WINDOWS, MACOS, iOS, ANDROID, LINUX, etc.) for use by IHS 102.

BIOS 217 provides an abstraction layer that allows the operating system to interface with the hardware components of the IHS 102. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 102 embodiments may utilize sensor hub 214 capable of sampling and/or collecting data from a variety of sensors. For instance, sensor hub 214 may utilize hardware resource sensor(s) 212, which may include electrical current or voltage sensors, that are capable of determining the power consumption of various components of IHS 102 (e.g., CPU 201, GPU 207, system memory 205, etc.). In certain embodiments, sensor hub 214 may also include capabilities for determining a location and movement of IHS 102 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 102, absence from IHS 102, and/or distance from IHS 102 (e.g., near-field, mid-field, or far-field).

In certain embodiments, sensor hub 214 may be an independent microcontroller or other logic unit that is coupled to the motherboard of IHS 102. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 102.

As illustrated, IHS 102 may utilize embedded controller (EC) 220, which may be a motherboard component of IHS 102 and may include one or more logic units. In certain embodiments, EC 220 may operate from a separate power plane from the main processors 201 and thus the OS operations of IHS 102. Firmware instructions utilized by EC 220 may be used to operate a secure execution system that may include operations for providing various core functions of IHS 102, such as power management, management of operating modes in which IHS 102 may be physically configured and support for certain integrated I/O functions.

EC 220 may also implement operations for interfacing with power adapter sensor 221 in managing power for IHS 102. These operations may be utilized to determine the power status of IHS 102, such as whether IHS 102 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 102 may not include each of the components shown in FIG. 2. Additionally, or alternatively, IHS 102 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
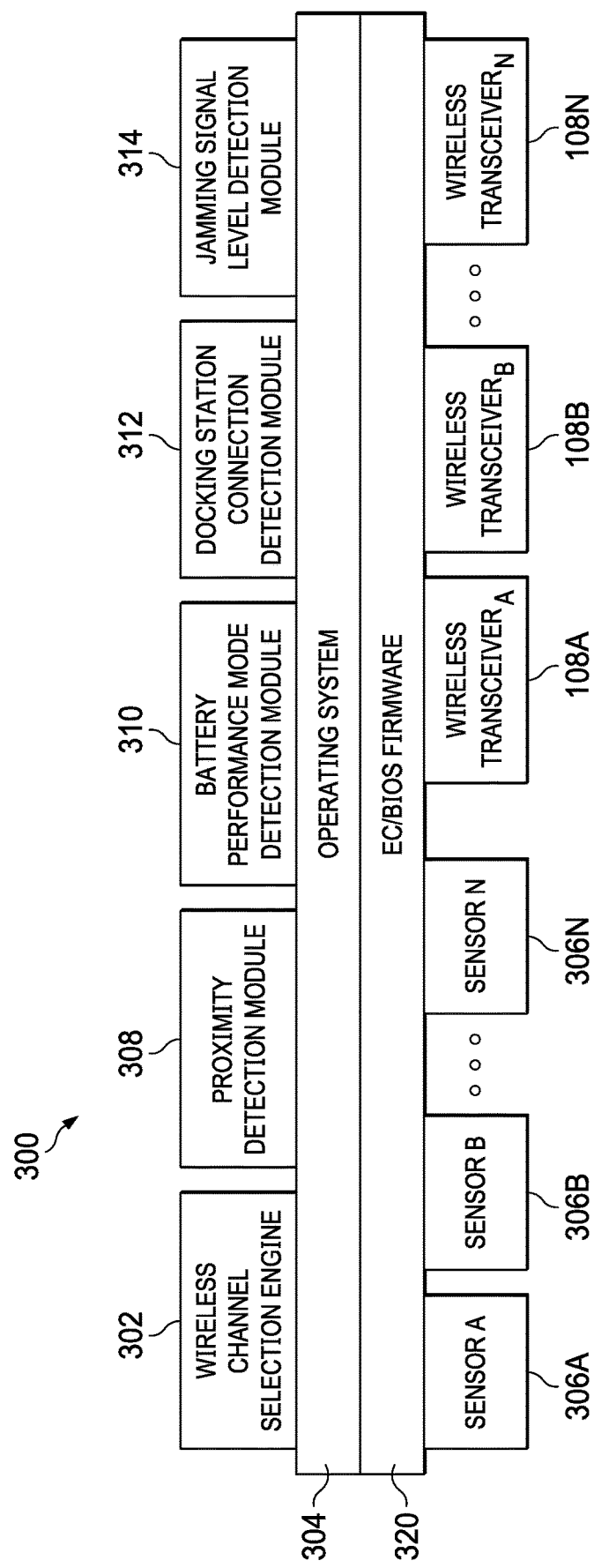
FIG. 3 is a block diagram illustrating an example of software system produced by IHS for selecting one or more wireless channels from among multiple wireless channels according to one embodiment of the present disclosure.

FIG. 3 is a block diagram illustrating an example of software system 300 produced by IHS 102 for selecting one or more wireless channels from among multiple wireless channels according to one embodiment of the present disclosure. In some embodiments, each element of software system 300 may be provided by IHS 102 through the execution of program instructions by one or more logic components (e.g., processor(s) 201, BIOS 217, EC 220, etc.) stored in memory (e.g., system memory 205), storage device (s) 219, and/or firmware 217, 220.

As shown, software system 300 includes a wireless channel selection engine 302 configured to manage the selection of wireless transceivers 108A-N. For example, wireless channel selection engine 302 may be embodied as part of the DELL PRECISION OPTIMIZER. Meanwhile, examples of wireless transceivers 108A-N include, but are not limited to, Wi-Fi, Bluetooth, ultra wide band (UWB), WiGig (60 GHz Wi-Fi), near field communications (NFC), cellular communications, and the like.

Both wireless channel selection engine 302 and wireless transceivers 108A-N are executed by OS 304, which is turn supported by EC/BIOS instructions/firmware 217, 220. EC/BIOS firmware 217, 220 is in communications with, and configured to receive data collected by, sensor modules or drivers 306A-N—which may abstract and/or interface with hardware resource sensor 212, proximity sensor 215, and power adapter sensor 221, for example. In various embodiments, software system 300 also includes a proximity detection module or application programming interface (API) 308, battery performance mode detection module or API 310, docking station connection detection module 312, and jamming signal level detection module or API 314 executed above OS 304.

Proximity detection module 308 acquires and processes proximity data associated with an estimated distance between IHS 102 and docking station 104. In one embodiment, proximity detection module 308 uses one or more proximity detection mechanisms configured in wireless transceivers 108A-N to estimate a proximity of IHS 102 to docking station 104. Examples of such proximity detection mechanisms include a received signal strength indicator (RSSI) or a time of flight (ToF) mechanism as is typically found in Wi-Fi wireless transceivers, a fine time measurement (FTM) mechanism typically found in WiGig wireless transceivers, a high accuracy distance measurement (HADM) mechanism typically found in Bluetooth wireless transceivers, an angle of arrival (AoA), angle of departure (AoD), and/or near field communications (NFC) mechanisms typically found in ultra wide band wireless transceivers, and the like. In some embodiments, proximity detection module 308 may also acquire proximity data from global positioning system (GPS) sensors configured in either or both of IHS 102 and docking station 104.

Battery performance mode detection module 310 acquires information associated with a battery performance mode in which IHS 102 is currently operating in. Examples of battery performance modes that IHS 102 may operate in may include a charging mode, a high performance battery mode, a minimum battery performance mode, a suspended battery performance mode, a hibernation battery performance mode, and the like.

Docking station connection detection module 312 acquires information associated with which wireless transceivers possess an active wireless connection with their corresponding wireless transceivers 108A-N configured in docking station 104. IHS 102 may possess an active connection with docking station 104 using only one wireless transceiver or multiple wireless transceivers. Alternatively, IHS 102 may possess no active connection with docking station 104, such as when IHS 102 is located at a substantial distance from docking station 104. Docking station connection detection module 312 acquires such information, and provides this connection status to wireless channel selection engine 302 for selection of one wireless communication link.

Jamming signal level detection module 314 generates an estimate signal noise level on each wireless transceiver 108A-N, and reports the estimated signal noise level to wireless channel selection engine 302. For example, in conditions where numerous wireless channels may simultaneously exist, such as in an office setting where numerous individuals may be concurrently using wireless devices, a wireless communication may experience a relatively large amount of noise (e.g., jamming) such that data throughput (e.g., bandwidth) is diminished. In such cases, this information may be reported to wireless channel selection engine 302 so that a different wireless transceiver 108A-N may be established that is not currently experiencing an excessive level of noise.

In one embodiment, wireless channel selection engine 302 may use predetermined and/or adjustable threshold values to select one or more wireless transceivers 108A-N for IHS 102 to communicate with wireless docking station 104. For example, wireless channel selection engine 302 may, upon determining that an estimated proximity of IHS 102 to wireless docking station 104 exceeds a certain distance (e.g., Wi-Fi communication link is currently selected and the proximity has recently become greater than 200 feet in length), wireless channel selection engine 302 may establish another wireless channel via one having a relatively narrow beam and extended distance coverage so that IHS 102 may continue communicating with wireless docking station 104.

In another embodiment, wireless channel selection engine 302 may use machine learning to select one from among multiple wireless transceivers 108A-N for IHS 102 to communicate with wireless docking station 104. In general, certain wireless channels have certain advantages and other disadvantages. For example, UWB wireless channels can use a very low radio frequency (RF) energy level for short-range, high-bandwidth communications over a large portion of the transceiver spectrum. Thus, they possess an advantage in that they can provide relatively good immunity from other nearby wireless devices (e.g., jamming). UWB communications, however, possesses several disadvantages in that they are limited to short-range communications, and consume a relatively large amount of electrical power. As another example, a Bluetooth wireless channel possesses an advantage in that it consumes relatively low levels of electrical power, yet possesses a disadvantage in that its proximity detection mechanisms are not as accurate as other wireless communication technologies. Additional features of wireless channel selection engine 302 will be described in detail herein below.

Wireless channel selection engine 302 may create a classifier using a machine learning algorithm such as, for example, linear classifier, quadratic classifier, naive Bayes classifier, random forest, neural network, or the like. The machine learning algorithm may include a trained classifier that analyzes the data and identifies a predefined operational context of IHS 102 that is closest (e.g., most similar) to the type that may be provided by any one available wireless channel. Wireless channel selection engine 302 may then select that wireless channel that most closely matches the operational context that IHS 102 is currently experiencing.

Combinations of different operational contexts in which IHS 102 may exist may be analyzed by wireless channel selection engine 302 to select one or several wireless channels from among multiple wireless channels 106. That is, data gathered from proximity detection module 308, battery performance mode detection module 310, docking station connection detection module 312, and/or jamming signal level detection module 314 may be used to train the classifier to identify a profile (among multiple profiles that were tested) describing an operational context from which one particular wireless communication may be selected.

In operation, wireless channel selection engine 302 monitors proximity detection module 308, battery performance mode detection module 310, docking station connection detection module 312, jamming signal level detection module 314, and wireless transceivers 108A-N executing on IHS 102. Particularly, wireless channel selection engine 302 may gather the data for a predetermined period of time (e.g., 15, 30, 45, 60 minutes or the like), and for each wireless transceiver 108A-N, classify its level of suitability according to the determined operational context. Moreover, wireless channel selection engine 302 may characterize, at runtime, IHS 102 to determine an optimum wireless channel 106 based upon how IHS 102 is operating, and where IHS 102 is operating at based upon its location relative to docking station 104. Machine learning may be used to gather data associated with each wireless channel 106, select a corresponding operating mode for providing a wireless channel 106 between IHS 102 and docking station 104.

Figure 4:
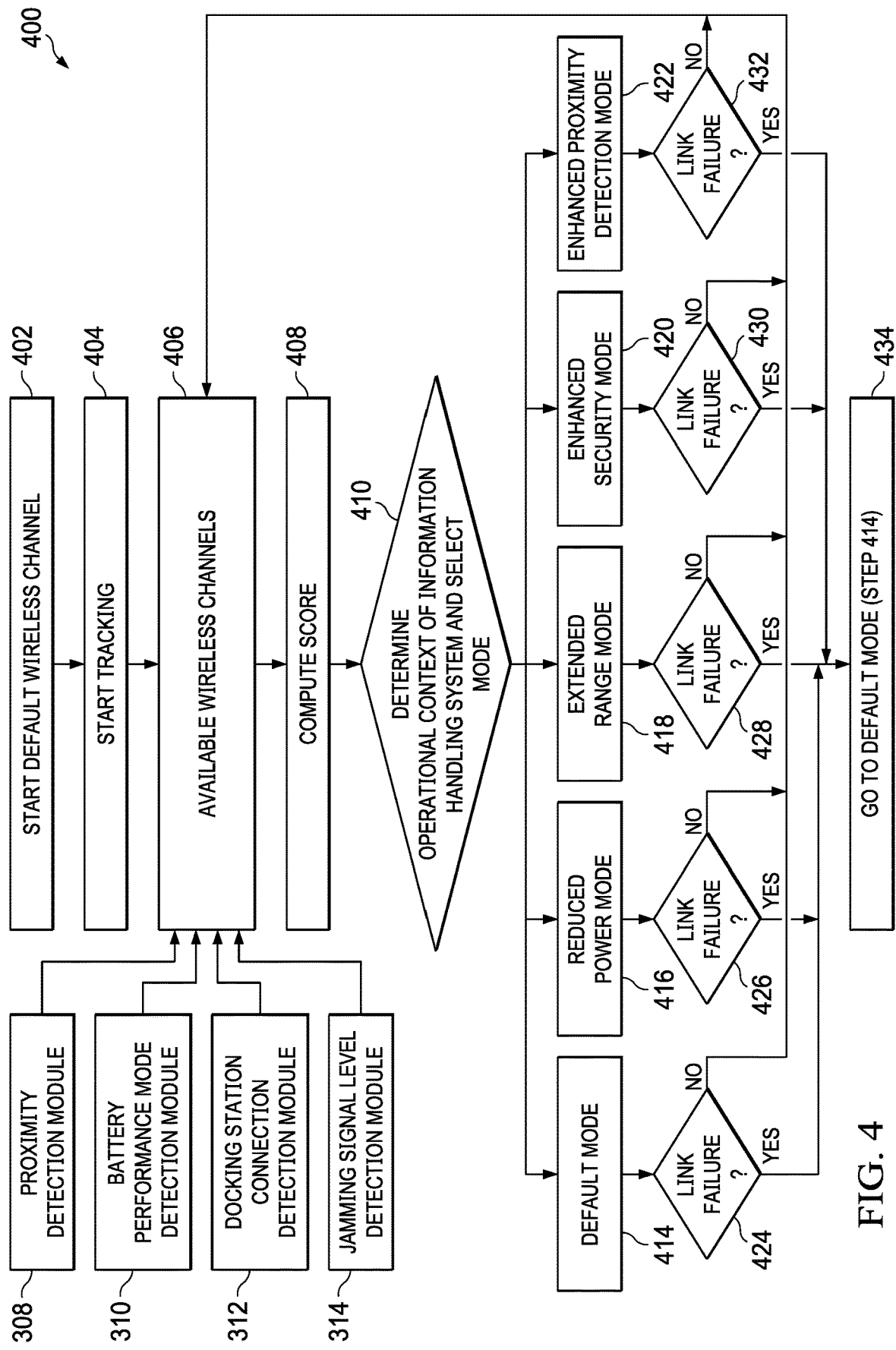
FIG. 4 is a flowchart illustrating an example wireless channel selection method according to one embodiment of the present disclosure.

FIG. 4 is a flowchart illustrating an example wireless channel selection method 400 according to one embodiment of the present disclosure. In some embodiments, method 400 may be executed, at least in part, by operation of wireless channel selection engine 302. As noted above, wireless channel selection engine 302 may monitor proximity detection module 308, battery performance mode detection module 310, docking station connection detection module 312, and jamming signal level detection module 314 as well as wireless transceivers 108A-N operating on IHS 102, gather data over an ongoing period of time, and use the gathered data to characterize the operational context of IHS 102 and select a wireless channel 106 that would optimally meet the criteria of the characterized operational context. In various implementations, method 400 may be used to adaptively manage the various characterizations, learning, and/or optimization techniques performed by wireless channel selection engine 302 by ranking wireless transceivers 108A-N by order of priority, which takes into account information received by proximity detection module 308, battery performance mode detection module 310, docking station connection detection module 312, and jamming signal level detection module 314. In one embodiment, wireless channel selection engine 302 classifies the wireless channels according to a particular characteristic mode of operation (e.g., a reduced power mode, an extended range mode, a default mode, an enhanced security mode, and an enhanced accuracy mode), and selects one particular mode based upon the detected operational context of IHS 102. Although only a reduced power mode, an extended range mode, a default mode, an enhanced security mode, and an enhanced accuracy mode are shown and described herein, it should be appreciated that other modes of operation may exist.

Initially at step 402, method 400 selects a default wireless channel for establishing communication with docking station 104. The default wireless channel 106 may be any type, such as a Wi-Fi communication channel that is used with traditional wireless docking stations. At step 404, method 400 starts tracking proximity detection module 308, battery performance mode detection module 310, docking station connection detection module 312, jamming signal level detection module 314, and wireless transceivers 108A-N under execution by IHS 102. At step 406, method 400 records characteristics of each available wireless channel 106 in addition to data that will be used to determine its operational context. For example, method may briefly turn on each wireless transceiver 108A-N, and obtain performance data (e.g., data throughput, bit error rate, level of burstiness, etc.) associated with that wireless transceiver 108A-N and store the performance data in addition to other data used to determine an operational context for later analysis. Thereafter at step 408, method 400 may compute a score for each wireless communication link, according to the determined operational mode of IHS 102.

At step 410, method 400 determines an operational context that IHS 102 is currently operating in. For example, method 400 may process data received from proximity detection module 308, battery performance mode detection module 310, docking station connection detection module 312, and jamming signal level detection module 314, to determine the operational context of IHS 102. Based upon the determined operational context, method 400 may select one wireless channel operating mode (e.g., 414, 416, 418, 420, or 422) from among multiple modes, and establish a wireless channel 106 that optimally meets the requirements of that particular operational mode.

For example, if method 400 determines that IHS 102 is operating at a reduced power mode (e.g., battery mode), given this information in addition to other information obtained about IHS 102, it may select a wireless channel 106 (e.g., Bluetooth wireless channel) that functions sufficiently at a low power level. As another example, if wireless channel selection engine 302 determines that the currently selected wireless channel 106 is experiencing a relatively large amount of interference, given this information in addition to other information obtained about IHS 102, it may select a wireless channel 106 (e.g., UWL wireless channel) that provides a relatively good immunity to extraneous noise in the environment.

Method 400 continually analyzes information about IHS 102 to determine its operational context of IHS 102 in addition to the currently selected wireless channel 106 to ensure it meets the requirements of the determined operational context. For each selected mode of operation (e.g., 414, 416, 418, 420, and 422), if another different operating mode more closely meets the determined operational context in which IHS 102 is operating, another wireless channel 106 will be established using that operating mode.

As shown, the wireless channel operating modes that may be selected include a default mode 414, a reduced power consumption mode 416, an extended range mode 418, an enhanced security mode 420, and an improved proximity detection accuracy mode 422. While in either one of the aforecited modes, wireless channel selection engine 302 continually monitors the status of existing wireless transceivers 108A-N in IHS 102, and records metrics to determine those wireless channels that may be available for use. One example of a metric that may include a list of available wireless transceivers 108A-N with pre-defined or adjustable priority levels and order in which they may be activated.

Another example metric may include transceiver availability metrics, such as link quality (QoS), channel environment, whether or not the module/driver supporting the transceiver is functioning properly, power status of IHS 102 and its mapping to whether that transceiver can operate at that power status. Yet another example metric may include proximity/location-related data by previously-used wireless transceivers. Wireless channel selection engine 302 may also maintain a list of preferred pairs of multiple wireless transceivers 108A-N with estimates of overall coverage range along with an order of activation within each pair.

The default mode 414 generally refers to default (e.g., go to) option that is selected automatically unless an alternative is specified. In particular, the default mode 414 may use a standard, well-established wireless link technology that may be used when other less proven wireless link technologies may, or may not be known to function properly. Some wireless link technologies could potentially become unusable either before operation or during operation due to various unexpected reasons, such as congested channel environment, poor link quality, failure in module/driver function, IHS's not allowing its operation under the specific power status, and the like. Even when these unexpected problems are experienced, a wireless channel using a well-established link technology should provide a relatively high level of reliability to ensure that IHS 102 is still able to communicate with docking station in the worst of conditions. One example of such a wireless link technology that may be suitable for the default mode include the Wi-Fi protocol.

In the default mode 414, wireless channel selection engine 302 may also store a pre-defined (or adjustable) table of multiple transceivers for proximity/location detection, which may indicate priority level of use. In one embodiment, wireless channel selection engine 302 may obtain and store proximity/location-based data that can be used by yet to be used transceivers for enhanced proximity and location accuracy.

The reduced power consumption mode 416 refers to one or a group of transceivers that can be used at reduced power levels. Examples of such transceivers may include Bluetooth and near field communications (NFC). In order to limit activation time of high power-consuming transceivers for proximity/location function, scheduled switching to a low power-consuming transceiver may be beneficial. For example, while UWB location detection using a UWB transceiver can provide relatively accurate proximity information, its power consumption is often high (e.g., greater than 100 mW). Thus, accurate proximity/location detection may be provided by initially using a low power consuming transceiver's proximity detection function (e.g., Bluetooth RSSI) to obtain a coarse estimation of location, and then briefly switching to a UWB transceiver to fine tune the location estimation.

While in the reduced power consumption mode 416, wireless channel selection engine 302 may, in addition to the metrics described above, monitor and record a power consumption rate for each available transceiver, and an elapsed time duration since activation of each of the transceivers. Wireless channel selection engine 302 may also monitor and record a time duration for one turn of estimation for proximity/location per first and second transceivers, and a quantity of required turns of estimation for the proximity/location function in each of the first and second transceivers to calculate a cumulative overall time needed to obtain the proximity/location estimate.

The extended range mode 418 generally refers to one or a group of transceivers that can be used at a relatively long distances. Examples of such transceivers may include Wi-Fi narrow beam, and cellular communications (3G, 4G, 5G, etc.). While in the extended range mode 418, wireless channel selection engine 302 may, in addition to the metrics described above, monitor and record a coverage range and a beam angle width for each transceiver. Wireless channel selection engine 302 may also monitor and record information associated with a type of environment at a given location, which can further limit the actual coverage experienced. For example, the coverage range of wireless technologies, such as WiGig, may be limited by obstacles (e.g., walls) due to its relatively high frequency range of operation.

Nevertheless, wireless transceivers capable of operation at extended distances may, in some cases, not provide a sufficient proximity or location estimation. As such, in order to make a proximity estimation with sufficient accuracy, a scheduled switching sequence between a long-range transceiver and a wide-angle transceiver may be beneficial. For example, while WiGig FTM can provide very accurate location/proximity performance, its coverage (range) is limited and narrow-angled due to the inherent characteristics of the 60 GHz millimeter Wave band used by WiGig transceivers. Thus, sufficiently accurate proximity/location detection may be provided by sequentially using WiGig FTM to obtain a relatively accurate proximity estimation followed by use of Wi-Fi narrow beam to use its extended range capabilities.

In order to switch to the extended range mode 418, wireless channel selection engine 302 may process certain information to provide a relatively instantaneous (seamless) switch over. For example, wireless channel selection engine 302 may estimate a coarse distance estimate and direction (trajectory) estimate to the new target location of IHS 102. Additionally, wireless channel selection engine 302 may also process estimated error information associated with the coarse distance estimate and direction estimate to determine whether switching to the extended range wireless transceiver could be successfully accomplished.

The enhanced security mode 420 generally refers to one or a group of transceivers that possess relatively good immunity to illicit access and/or noise that may exist in the form of other electronic devices operating nearby. Example of wireless technologies possessing relatively good security may include Bluetooth, Wi-Fi, and UWB. While in the enhanced security mode 420, wireless channel selection engine 302 may, in addition to the metrics described above, monitor and record a security level and jamming vulnerability level for each transceiver, and a type of environment at a given proximity in terms of how many jamming attacks can be typically expected. For example, operation of system 100 in a public venue, such as at a public park or sports arena, may be substantially more conducive to jamming attacks than when the system 100 is operated in a controlled environment, such at an office or home of the user.

In order to form a wireless channel that is immune to noise (e.g., jamming), scheduled switch over between a low-security transceiver having relatively low security and a transceiver having relatively good security may be beneficial. Because such security-reinforced wireless proximity technologies may have limited range and/or availability, composition across multiple technologies may be used for protection from intended or unintentional jamming attacks. For example, a location of an automobile in a parking lot may be found using UWB transceiver, but an actual car door opening should be verified by a short range NFC technology. As another example, two proximity detection mechanisms of Bluetooth HADM, namely Phase Method and FTM with encrypted packets, each have different merits. Therefore, wireless channel selection engine 302 may sequentially switch between Bluetooth phase method, and Bluetooth FTM so that a relatively good level of security may be provided while also providing a sufficient level of proximity estimation.

The enhanced proximity detection mode 422 refers to at least two transceivers that may be simultaneously operated to provide an improved proximity estimation over what could otherwise be provided by a single transceiver. While some proximity/location technologies may possess good resolution, collaboration among multiple transceivers may further enhance their accuracy and consistency. While in the enhanced proximity detection mode 422, wireless channel selection engine 302 may, in addition to the metrics described above, monitor and record a list of preferred pairs of multiple transceivers with overall proximity detection performance (resolution accuracy) and order of activation within each pair. Wireless channel selection engine 302 may also monitor and record an estimated proximity resolution for each transceiver, and a type of environment for detection/location operation; that is, whether each listed transceiver is indoor, outdoor, and whether it is line of sight (LOS) only or non-line of sight (NLOS). Wireless channel selection engine 302 may also derive an estimate of proximity/location accuracy with respect to one or more applications (APPs) currently executed on IHS 102.

During a pre-defined duration (or during the entire operation of IHS 102), wireless channel selection engine 302 may concurrently turn on multiple transceivers for proximity detection. In one embodiment, wireless channel selection engine 302 may use data at a high-layer stack of each transceiver to assemble proximity data in a unified format. For example, wireless channel selection engine 302 may perform a proximity/location data format conversion of proximity data obtained from each transceiver into a standardized format. For example, Bluetooth, while providing relatively good location accuracy (less than 1 meter with version 6.0), it only provides a relative location estimation based on triangulation among multiple remotely located access points. While Wi-Fi FTM may not be as accurate, it does provide absolute location estimation capabilities. Thus, wireless channel selection engine 302 may process relatively accurate location data obtained from the Bluetooth transceiver into an absolute data format (e.g., longitude/latitude coordinates) so that the proximity/location capabilities of the system 100 may be enhanced.

For each operating mode, if a link failure occurs, method 400 continues processing at step 434 in which the default mode is selected; otherwise, processing continues at step 406 in which method 400 continues to monitor for changes in the operational context of IHS 102.

Accordingly, method 400 may be used to enable dynamic machine learning of the performance of each of multiple wireless channels 106 to select an optimum wireless channel 106 based on context. As a result, method 400 continually maintains an optimum wireless channel 106 between IHS 102 and docking station 104 based upon an operational context (e.g., location of IHS 102 relative to docking station 104, ambient RF noise, security requirements, battery state, etc.) of IHS 102 that in many cases, may not require user input.

Although FIG. 4 describes one example of a process that may be performed by IHS 102 for managing a communication link with a docking station, the features of the disclosed process may be embodied in other specific forms without deviating from the spirit and scope of the present disclosure. For example, the method 400 may perform additional, fewer, or different operations than those operations as described in the present example. As another example, the steps of the process described herein may be performed by a computing system other than IHS 102, such as by one or more processors configured on docking station.

FIG. 5 illustrates an example table 500 showing how wireless channel selection engine 302 may determine an operation mode of IHS 102 according to various exemplary criteria associated with its operational context according to one embodiment of the present disclosure. It should be appreciated that table 500 does not show an exhaustive list of all possible operational contexts that IHS 102 may encounter; rather, it merely shows several example operational contexts that may be used for selecting an optimal wireless channel 106 for communicating with docking station 104.

At use case 502, wireless channel selection engine 302 has determined that IHS 102 is at an office (e.g., cube) of the user of IHS 102 due to proximity data obtained from proximity detection module 308. Additionally, engine 302 has determined that IHS 102 is operating at a best performance battery mode, that the direction of movement with respect to docking station 104 is towards the docking station 104, that no jamming signal is detected, and the docking station connection status is not connected due to other data obtained from modules 205 through 208. Given this information, engine 302 selects a reduced power consumption mode 416 due mainly to the fact that no communication between IHS and docking station 104 is being conducted at the present time.

At use case 504, wireless channel selection engine 302 has determined that IHS 102 is at a conference room nearby to the office of the user of IHS 102 due to proximity data obtained from proximity detection module 308. Additionally, engine 302 has determined that IHS 102 is operating at a best performance battery mode, that no direction of movement with respect to docking station 104 is detected, that no jamming signal is detected, and the docking station 104 is connected due to other data obtained from modules 308 through 314. Given this information, engine 302 selects a default mode 418 due mainly to, among other things, that the wireless channel (e.g. Wi-Fi), optimally meets the requirements of the operational context of IHS 102.

At use case 506, wireless channel selection engine 302 has determined that IHS 102 is at a cafeteria due to proximity data obtained from proximity detection module 205. Additionally, engine 302 has determined that IHS 102 is operating at a best performance battery mode, that no direction of movement with respect to docking station 104 is detected, that no jamming signal is detected, and the docking station connection status is not connected due to other data obtained from modules 308 through 314. Given this information, engine 302 selects no mode due mainly to the fact that the distance of IHS 102 from docking station 104 is sufficiently large to effectively inhibit communication through any available wireless channel.

At use case 508, wireless channel selection engine 302 has determined that IHS 102 is at an office (e.g., cube) of the user of IHS 102 due to proximity data obtained from proximity detection module 308. Additionally, engine 302 has determined that IHS 102 is operating at a power saving battery mode, that the direction of movement with respect to docking station 104 is moving away the docking station 104, that no jamming signal is detected, and the docking station connection status is not connected due to other data obtained from modules 308 through 314. Given this information, engine 302 selects no mode due mainly to the fact that engine 302 has determined that movement away from docking station 104 infers that IHS 102 is leaving the office or other location where the docking station is located.

At use case 510, wireless channel selection engine 302 has determined that IHS 102 is at an office (e.g., cube) of the user of IHS 102 due to proximity data obtained from proximity detection module 308. Additionally, engine 302 has determined that IHS 102 is operating at a best performance battery mode, that the direction of movement with respect to docking station 104 is towards the docking station 104, that a jamming signal has been detected, and the docking station connection status is not connected due to other data obtained from modules 308 through 314. Given this information, engine 302 selects an enhanced security mode 420 due mainly to the fact that interfering signals have been detected, and that those jamming signals have been sufficiently large to inhibit communication through the currently selected wireless channel.

At use case 512, wireless channel selection engine 302 has determined that IHS 102 is again at the conference room due to proximity data obtained from proximity detection module 308. Additionally, engine 302 has determined that IHS 102 is operating at a power saving battery mode, that no direction of movement with respect to docking station 104 is detected, that no jamming signal is detected, and the docking station connection status is connected due to other data obtained from modules 308 through 314. Given this information, engine 302 selects either a default mode 414 or an extended range mode 418 based on several factors including performance (e.g., data throughput) of a wireless channel, and a desired level of battery consumption.

Thus as can be clearly seen from the foregoing use cases, the system 100 can use any combination of multiple inputs to determine an optimum communication node to be established between IHS 102 and docking station 104. Not only does the system 100 determine a proximity of IHS 102 relative to docking station 104, it also can determine a trajectory of movement so that changing operational contexts can be estimated so that little or no downtime of a wireless channel between IHS 102 and docking station 104 is experienced. Additionally, because multiple inputs are used, the wireless channel between IHS 102 and docking station 104 can be optimized for any prevailing operational context that IHS 102 may encounter. The system 100 may also implement a supervisory machine learning algorithm so that these inputs may be continually monitored for ongoing enhancement of the accuracy and efficiency in which wireless channels are established, removed, and/or replaced with other wireless channels.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A communication system comprising:
 a first electronic device comprising:
 one or more processors; and
 one or more memory units coupled to the one or more processors, the memory units storing computer-readable instructions that, upon execution by the one or more processors, cause the first electronic device to:
  establish a connection with a second electronic device using a first wireless channel that operates according to a first wireless communication protocol;
  identify an operational context of the first electronic device, the operational context comprising a proximity of the first electronic device relative to the second electronic device using a machine learning technique that analyzes stored historical information to infer the operational context of the first electronic device;
  select the second wireless channel according to a geographical location comprising at least one of an office of a user of the first electronic device, a home of a user of the first electronic device, a conference room of a user of the first electronic device, a vehicle of a user of the first electronic device, and an office location of a user of the first electronic device, wherein the operational context comprises the geographical location; and
  establish the connection with the second electronic device using a second wireless channel that operates according to a second wireless communication protocol based on the identified operational context of the first electronic device, wherein the first wireless communication protocol is different than the second wireless communication protocol.

2. The communication system of claim 1, wherein the first electronic device comprises an information handling system (IHS) and the second electronic device comprises a wireless docking station.

3. The communication system of claim 2, wherein the operational context comprises a docking connection status of the IHS relative to the docking station, and wherein the instructions further cause the first electronic device to select the second wireless channel according to the docking connection status of the second wireless channel.

4. The communication system of claim 1, wherein the instructions further cause the first electronic device to simultaneously obtain location data associated with a current location of the first electronic device from a plurality of location detection devices, and combine the location data from each of the location detection devices to generate an enhanced location estimation of the first electronic device.

5. The communication system of claim 4, wherein the instructions further cause the first electronic device to convert a format of location data obtained from each of the location detection devices into a standardized format.

6. The communication system of claim 5, wherein the location detection devices each comprise at least one of a WI-Fi received signal strength indicator (RSSI) device, a Wi-Fi time of flight (ToF) mechanism, a WiGig-Fi fine time measurement (FTM) mechanism, a Bluetooth high accuracy distance measurement (HADM) mechanism, an ultra wide band (UWB) angle of arrival (AoA) device, a UWB angle of departure (AoD) device, a near field communications (NFC) mechanism, or a global positioning system (GPS) sensor.

7. The communication system of claim 1, wherein the instructions further cause the first electronic device to select the second wireless channel according to the operational context comprising at least one of a geographical location of the first electronic device, a power consumption level of the second wireless channel, a required security level of the second wireless channel, and an extended range of the second wireless channel.

8. A method comprising:
 establishing, using instructions stored in at least one memory and executed by at least one processor, a connection with a second electronic device using a first wireless channel that operates according to a first wireless communication protocol;
 identifying, using the instructions, an operational context of the first electronic device, the operational context comprising a proximity of the first electronic device relative to the second electronic device using a machine learning technique that analyzes stored historical information to infer the operational context of the first electronic device;
 selecting, using the instructions, the second wireless channel according to a geographical location comprising at least one of an office of a user of the first electronic device, a home of a user of the first electronic device, a conference room of a user of the first electronic device, a vehicle of a user of the first electronic device, and an office location of a user of the first electronic device, wherein the operational context comprises the geographical location; and establishing, using the instructions, the connection with the second electronic device using a second wireless channel that operates according to a second wireless communication protocol based on the identified operational context of the first electronic device, wherein the first wireless communication protocol is different than the second wireless communication protocol.

9. The method of claim 8, wherein the first electronic device comprises an information handling system (IHS) and the second electronic device comprises a wireless docking station.

10. The method of claim 9, wherein the operational context comprises a docking connection status of an IHS relative to a docking station, and wherein the method further comprises selecting the second wireless channel according to the docking connection status of the second wireless channel, wherein the first electronic device comprises an information handling system (IHS) and the second electronic device comprises a wireless docking station.

11. The method of claim 8, further comprising selecting the second wireless channel according to the operational context comprising at least one of a geographical location of the first electronic device, a power consumption level of the second wireless channel, a required security level of the second wireless channel, and an extended range of the second wireless channel.

12. A memory storage device having program instructions stored thereon that, upon execution by one or more processors of an Information Handling System (IHS), cause the IHS to:

establish a connection with a second electronic device using a first wireless channel that operates according to a first wireless communication protocol;

identify an operational context of the first electronic device, the operational context comprising a proximity of the first electronic device relative to the second electronic device using a machine learning technique that analyzes stored historical information to infer the operational context of the first electronic device;

select the second wireless channel according to a geographical location comprising at least one of an office of a user of the first electronic device, a home of a user of the first electronic device, a conference room of a user of the first electronic device, a vehicle of a user of the first electronic device, and an office location of a user of the first electronic device, wherein the operational context comprises the geographical location; and establish the connection with the second electronic device using a second wireless channel that operates according to a second wireless communication protocol based on the identified operational context of the IHS, wherein the first wireless communication protocol is different than the second wireless communication protocol.

13. The memory storage device of claim 12, wherein the first electronic device comprises an information handling system (IHS) and the second electronic device comprises a wireless docking station.

14. The memory storage device of claim 13, wherein the operational context comprises a docking connection status of the IHS relative to the docking station, and wherein the program instructions further cause the first electronic device to select the second wireless channel according to the docking connection status of the second wireless channel.

15. The memory storage device of claim 12, wherein the program instructions further cause the first electronic device to simultaneously obtain location data associated with a current location of the first electronic device from a plurality of location detection devices, and combine the location data from each of the location detection devices to generate an enhanced location estimation of the first electronic device.

16. The memory storage device of claim 15, wherein the instructions further cause the first electronic device to convert a format of location data obtained from each of the location detection devices into a standardized format.

17. The memory storage device of claim 15, wherein the location detection devices each comprise at least one of a WI-Fi received signal strength indicator (RSSI) device, a Wi-Fi time of flight (ToF) mechanism, a WiGig-Fi fine time measurement (FTM) mechanism, a Bluetooth high accuracy distance measurement (HADM) mechanism, an ultra wide band (UWB) angle of arrival (AoA) device, a UWB angle of departure (AoD) device, a near field communications (NFC) mechanism, or a global positioning system (GPS) sensor.

18. The memory storage device of claim 12, wherein the instructions further cause the first electronic device to select the second wireless channel according to the operational context comprising at least one of a geographical location of the first electronic device, a power consumption level of the second wireless channel, a required security level of the second wireless channel, and an extended range of the second wireless channel.

* * * * *